United States Patent
Bogle et al.

(12) 
(10) Patent No.: US 6,209,716 B1
(45) Date of Patent: Apr. 3, 2001

(54) KNUCKLE DRIVE LINK CONVEYOR BELT SYSTEMS WITH REMOVABLE LOAD CONVEYING SURFACE MEMBERS

(75) Inventors: David W. Bogle, Destrehan; Paul L. Horton, Metairie, both of LA (US); Dorian F. Steeber, Anderson; Olivier Duterte, Greer, both of SC (US)

(73) Assignee: The Laitram Corporation, Harahan, LA (US)

( * ) Notice: Subject to any disclaimer, the term of this patent is extended or adjusted under 35 U.S.C. 154(b) by 0 days.

(21) Appl. No.: 09/185,957

(22) Filed: Nov. 5, 1998

(51) Int. Cl.$^7$ .................................................. B65G 17/06
(52) U.S. Cl. .......................................... 198/852; 198/834
(58) Field of Search ................................ 198/852, 834, 198/831, 867.14, 867.01, 867.11, 853

(56) References Cited

U.S. PATENT DOCUMENTS

| | | | | |
|---|---|---|---|---|
| 3,768,631 | * | 10/1973 | Wahren | 198/189 |
| 3,910,406 | * | 10/1975 | Pulver et al. | 198/189 |
| 4,153,152 | * | 5/1979 | Lapeyre | 198/851 |
| 4,640,410 | | 2/1987 | Palmaer et al. | 198/803.01 |
| 4,852,722 | | 8/1989 | Houseman | 198/838 |
| 4,886,158 | * | 12/1989 | Lapeyre | 198/853 |
| 4,895,248 | * | 1/1990 | Wahren | 198/852 |
| 5,000,311 | | 3/1991 | Abbestam et al. | 198/803.01 |
| 5,402,880 | * | 4/1995 | Murphy | 198/852 |
| 5,404,997 | * | 4/1995 | Schreier et al. | 198/779 |
| 5,429,226 | | 7/1995 | Ensch et al. | 198/803.14 |
| 5,586,644 | | 12/1996 | Coen et al. | 198/853 |
| 5,803,236 | * | 9/1998 | Wahren | 198/852 |

FOREIGN PATENT DOCUMENTS

| | | |
|---|---|---|
| 2142649 | 3/1973 | (DE). |
| 0083119 | 7/1983 | (EP). |
| 2564810 | 11/1985 | (FR). |
| 8100244 | 2/1981 | (WO). |

\* cited by examiner

*Primary Examiner*—Christopher P. Ellis
*Assistant Examiner*—Rashmi Sharma
(74) *Attorney, Agent, or Firm*—Laurence R. Brown; James T. Cronvich

(57) ABSTRACT

This invention provides integrated knuckle drive link conveyor belt systems with improved long wear-high load bearing link coupling joints of a universal joint nature for permitting the belts to travel on straight or curvaceous paths which also feature expedited insertion of spindle rods extending through the knuckles, diverse sprocket drive capabilities and replaceable load conveying platform accessories of the plug-in or snap-in variety. A cylindrical knuckle, when the loaded belt is under tension, has a substantially semi-cylindrical high wear contact surface that handles heavy peak loads. That knuckle is installed expeditiously at a joint between end-to-end connected links constituting a special interfitted jig comprising a seat in the nose end of a link resting the knuckle in a registered operational position to receive the connecting spindle rod through trailing edge bifurcated arms of a leading modular link without a concurrent manual orientation of the knuckle. Diverse sprocket drive structure permits the belt to be driven from beneath or on either lateral side. The knuckle and surrounding seat provides three dimensional moving tolerances to provide the universal joint type operation at each link joint. Other features include side rollers to reduce friction on inner curve radii, and hold down flanges that keep the belt from fluttering off a base support surface. The rugged molded resulting plastic links are long wearing and resist catastrophic failure. The versatility and ruggedness of the system is significantly enhanced by the removable platform structure for heavy industrial use.

29 Claims, 8 Drawing Sheets

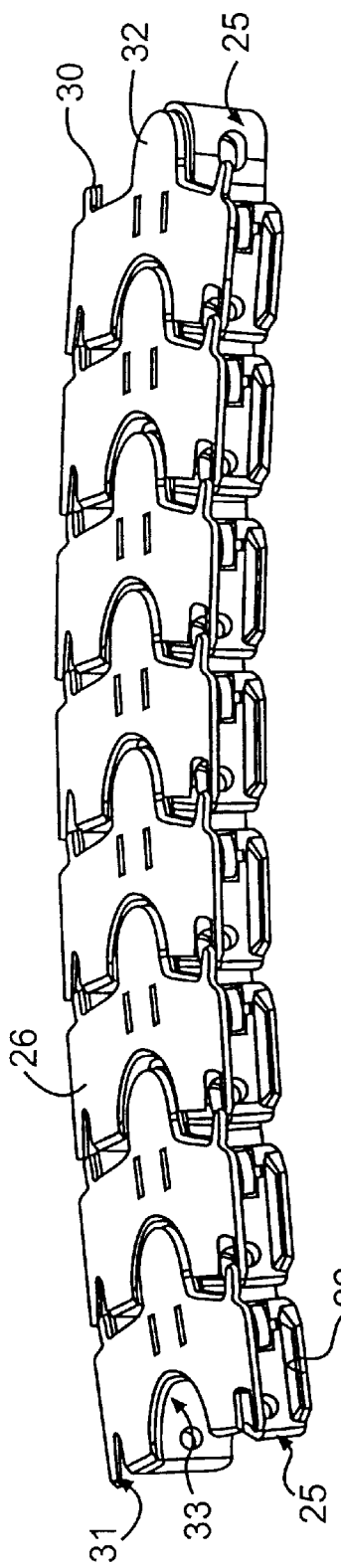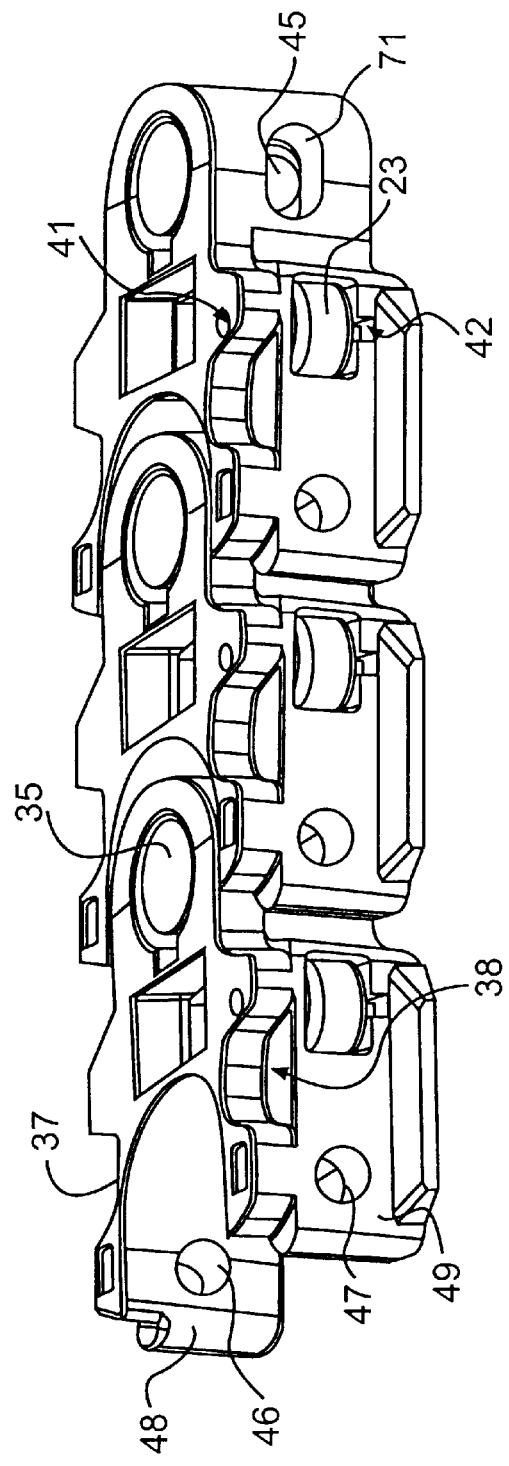
FIG. 3
FIG. 4

KNUCKLE DRIVE LINK CONVEYOR BELT SYSTEMS WITH REMOVABLE LOAD CONVEYING SURFACE MEMBERS

TECHNICAL FIELD

This invention relates to plastic link conveyor belt systems and more particularly it relates to narrow knuckle drive type of link conveyor belts having removable load conveying platform members and associated link construction features.

BACKGROUND ART

Knuckle linked type of link conveyor belt systems are well known in the art as exemplified by U.S. Pat. Nos.: 3,768,631, Oct. 30, 1973 to E. J. R. Wahren for Conveyor Belt Chain; 4,597,492, Jul. 1, 1986 to Lachonius, et al. for Conveyor Chain; and 5,402,880, Apr. 4, 1995 to J. F. Murphy for Article Carrying Chain Having Free Tab.

A primary deficiency of prior art knuckle linked conveyor belt systems has not been satisfactory because of the lack of diversity. Each system thus has a tendency to be custom engineered and constructed for a particular installation, product line or conveyor path configuration.

Thus an object of the present invention is to provide versatile links and conveyor systems of the knuckle linked type that are well adapted to universal use over a large range of applications, product lines and path configurations.

This type of prior art has been particulary unsatisfactory because it presents difficulties in required custom engineering, molding and assembling such plastic conveyor belt systems in order to meet the demands of new installations and products.

The versatility has not been present for example to provide conveyor belt systems that require long meandering paths that both curve laterally along the way and pass up and down declines. These installations, for example, must be adaptable to various types of drive configurations at different positions along the belt length in order to provide proper drive power to carry loads, to navigate curves, particularly in curves where the tension and loading on the belt is greatest.

Features of strength, life span, maintenance and repair access are most important when using molded plastic links. In addition the ability to mold link bodies that withstand the rigors of industrial use for various types of products is a continuing challenge in the art.

Some of the variations encountered that challenge the operation of such belt systems is the ability to produce at will in conveyor belt links the slickness needed to reduce driving power in movements about curves, sprockets and in contact with frictional surfaces of wear plates at belt edges and bottom parts of the belt which may be positioned at specified locations along the belt pathway. The uneven loading on the belt as it passes work stations or moves up inclines may demand installations of auxiliary drive sprockets.

Improvements are needed to the driving of belts under diverse operating conditions. The conventional sprocket drive systems that engage the bottom of the belt usually are located at belt loops requiring complex structure for transfer of products from one belt to another over long transport paths.

Furthermore, both the repair or maintenance of such belts in service and the initial belt installation in the prior art systems are difficult and time consuming. Access to the belt at a loop sprocket location of an industrial installation, for example, may be limited, and repairs may take the belts off line for long periods of time.

In the initial installations, the formation of a knuckle linked type belt from separate links provides a significant challenge. Thus the complex task of aligning and interconnecting belt links end-to-end require the knuckle to be held in precise alignment with spindle rods passed through nose end knuckle joints and the bifurcated trailing legs of a leading link. It is desirable to decrease the complexity of this task, including avoiding the nuisance of knuckles dropping out of position and falling to the floor.

A further problem is that these knuckle drive type conveyor chains have been limited in the types of sprocket drive configuration, without flexibility for example to interface with different sprocket drive systems which may be encountered.

Furthermore these systems have the limitation of integrally disposed conveying surfaces formed by the belt links, so that different basic links have to be designed and stocked for providing the different kinds of conveyor surfaces suitable for different products being conveyed, and different configurations of belts such as those which may travel on inclined paths, for example.

Other types of link conveyor belts have been adaptable to replaceable drive pads or modular overlays such as shown in U.S. Pat. Nos. 5,004,097, Apr. 2, 1991 to G. C. Roinestad, et al. for Replaceable Snap-on Modular Overlay for Rod and Link Turn-curve Conveyor Belts; and (FIG. 8) 5,582,287, Dec. 10, 1996 for Drive Chain for Accumulation Conveyor. Such replaceable drive surfaces however, present various problems such as forming a substantially continuous surface between links, without lateral spaces or cracks that can cause problems in conveying products that might pass over or rest on such spaces and cracks.

In knuckle drive type link belts, it has not heretofore been feasible to integrate such removable drive surfaces and overlays compatibly with the configuration restrictions of belts that have curving and inclined pathways for carrying various product lines.

It is therefore an objective of this invention to overcome such problems and deficiencies of prior art and to provide improved versatile knuckle joint type chain links and corresponding belt conveyor systems.

SUMMARY OF THE INVENTION

This invention affords versatile, improved knuckle type links adapted to readily form corresponding conveyor belt systems adapted to process a variety of products over complex conveyor belt pathways in industrial environments.

The plastic link body afforded by this invention is characterized by a rectangular aperture located between a knuckle cylindrical aperture in the link nose and the trailing nose receiving crotch from which bifurcated legs extend for receiving a spindle rod for securing links together end-to-end in a belt configuration.

This rectangular aperture presents a bottom sprocket receiving surface for conventional belt drive systems. In one embodiment of the invention the aperture extends through the link body to provide on the upper link surface a snap-lock detented socket for receiving a removable platform element carried upon the upper surface of the link. The upper portion of this quadrilateral aperture has detent ridges for locking a top surface conveyor platform section or accessory in place adjacent the upper link surface. That platform section has protruding therefrom mating resilient snap connected plastic spring arms extending down into the quadrilateral aperture on opposite sides of the link for registering and locking the platform in place.

The plastic link body is further characterized by presentation of sprocket teeth indentations in opposite sides of the link for permitting a sprocket wheel rotated about a vertical axis to drive a belt constructed of such links. This is particularly useful for long and curved conveyor transport paths to distribute belt drive units alongside the belt paths at convenient locations near curves and inclines where the loading stresses are higher.

In a typical link body, a forward directed nose section surrounding a cylindrical vertical bore through the link body encompasses a substantially cylindrical link connecting knuckle to serve as a housing for a universal knuckle joint connecting two links together end-to-end into a conveyor belt chain. The nose section integrally defines a set of trailing bifurcated legs with a crotch therebetween shaped to loosely surround the nose section of a trailing link.

A drive interconnection configuration for sprocket driven link conveyor belts employs the coupling knuckle between successive end-to-end coupled links in a substantially semi-cylindrical drive surface as the links are coupled together, loaded and in tension. This substantially semi-cylindrical low wear contact surface handles heavy peak loads. Thus the link body cylindrical nose aperture encircles the substantially cylindrical knuckle, which is held in place by a spindle rod journalled through the knuckle and the legs on each side of the crotch defined by integrally disposed trailing bifurcated legs dimensioned to loosely receive thereinto the nose of an end-to-end connected trailing link in a belt configuration.

The knuckle is dimensioned to fit loosely into the encompassing cylindrical housing for providing a degree of three dimensional movement thus to effectuate a universal action joint for permitting the conveyor belt to take a curvaceous path around curves and up or down inclined surfaces. In this respect the nose defines on opposite link lateral sides horizontal slots for passing the spindle rod through into the cylindrical knuckle receiving aperture in a configuration permitting the nose and knuckle to pivot together while retained within the crotch.

To provide for expedited insertion of spindle rods through the knuckles, The cylindrical housing is notched outwardly into the cylinder walls to produce a keyway and accompanying lowermost ledge at a depth for accepting a mating key ridge extending from the outer surface of the knuckle cylinder. This slat configuration provides a nest, or seat, holding the knuckle in position for registering the spindle rod between the bifurcated legs to extend through the nose walls and the knuckle journalling aperture. The knuckle thus is installed expeditiously to form a pivot joint between end-to-end connected links without employing the hands in a concurrent manual placement and retention of the knuckle.

Furthermore the links are provided with diverse sprocket drive capabilities comprising a rectangular aperture opening accessible from the bottom of the link, and indented sprocket tooth receptacles on opposite sides of the link. This sprocket drive structure permits the belt to be driven from beneath or on either lateral side, to thus exhibit universal characteristics for use with various types of drive systems.

The links thus have three primary plastic parts, a main link body, a removable load carrying platform member and a knuckle joint. Side rollers may also be installed to reduce friction at inner curve radii locations having a sidewall flange or wear surface.

The main link body has hold down flanges laterally extending from opposite sides near the link bottom surface for riding in associated wear surface channelwork at chosen positions along this belt pathway. This keeps the belt from vertical fluttering or vibration and supports it when inverted in the return.

Other features, objectives and advantages of the invention will be found throughout the following drawings, description and claims.

BRIEF DESCRIPTION OF THE DRAWINGS

In the accompanying drawings, wherein like reference characters represent similar features throughout the several views:

FIG. 3 is a top perspective view looking into the conveying surface of a conveyor belt segment afforded by this invention having replaceable object carrying platforms in place upon each link, FIG. 4 is a top perspective view of a segment of this conveyor belt without the removable conveyor surfaces in place looking into rollers disposed on one side of the link for contact with an edge railing in the manner shown in FIG. 2.

THE PREFERRED EMBODIMENTS

Figure 1:
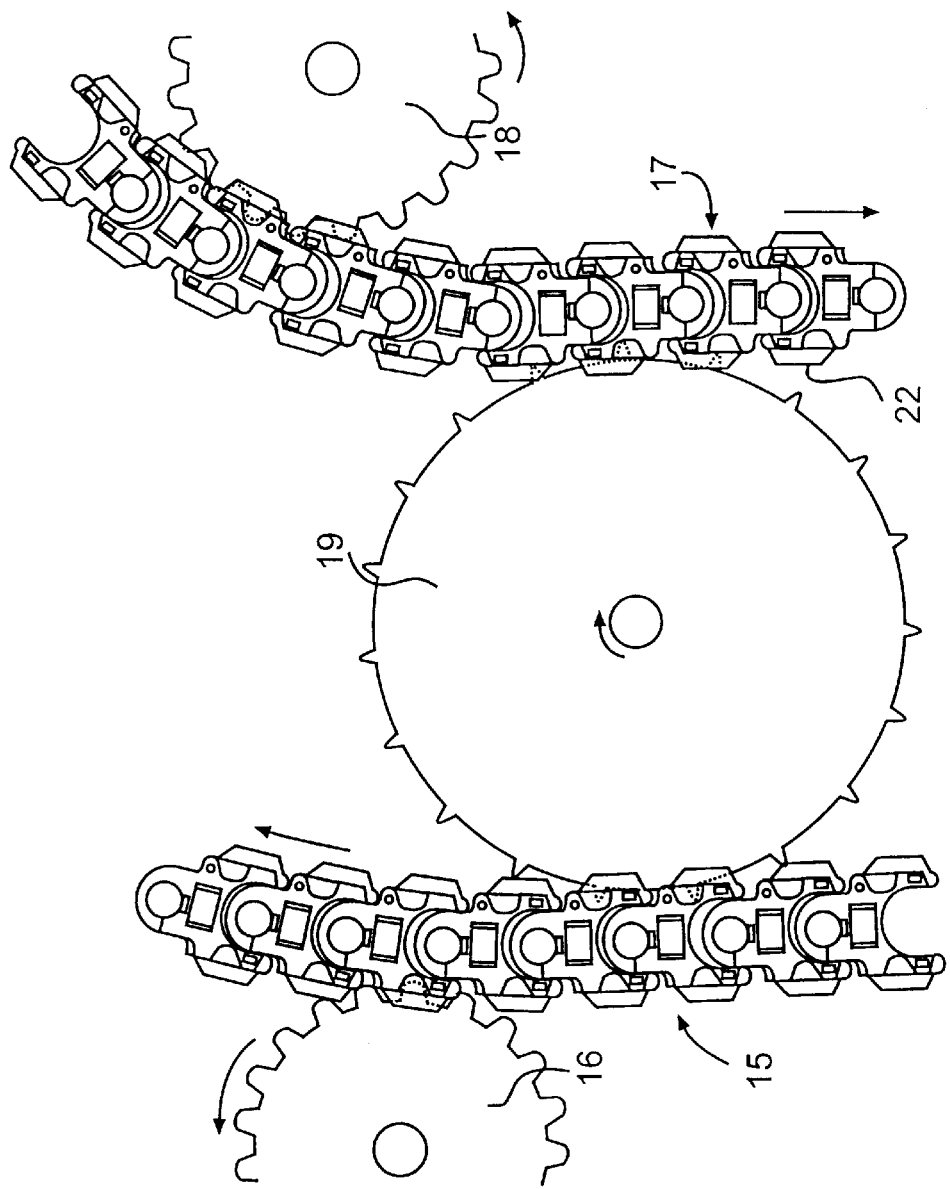
FIG. 1 is a plan, top view without installed removable conveyance platform members carried by each link of the knuckle type conveyor belt system afforded by this invention, which system shows two conveyor belts driven in opposite directions by laterally disposed drive sprockets having a vertical axis of rotation, wherein the belts are spaced a predetermined distance apart to run in parallel paths by an intermediate spiderwheel.

In FIG. 1, looking into the topside of the two narrow knuckle type conveyor belts having replaceable platform members removed, it is seen that the left belt 15 moves upwardly as propelled by laterally extending sprocket wheel 16 rotating about a vertical axis, whereas the right belt 17 moves downwardly as propelled by sprocket wheel 18. The belts are spaced apart a predetermined distance by the spider wheel 19 for parallel movement tangentially to the spider wheel 19. As will later be discussed in more detail, the belt links have drive structure for engaging sprocket members 16, 18 on opposite sides, and the sprocketed spider wheel 19 also registers into that drive structure.

Figure 2A:
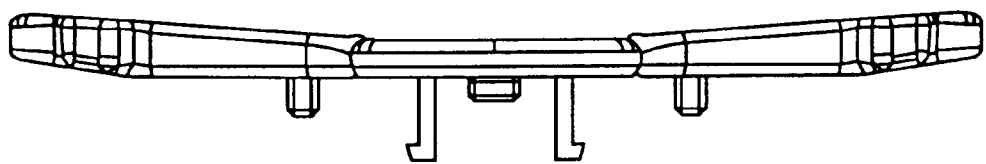
FIG. 2A is a fragmented end view sketch of a platform embodiment with a V-shaped profile.
Figure 2:
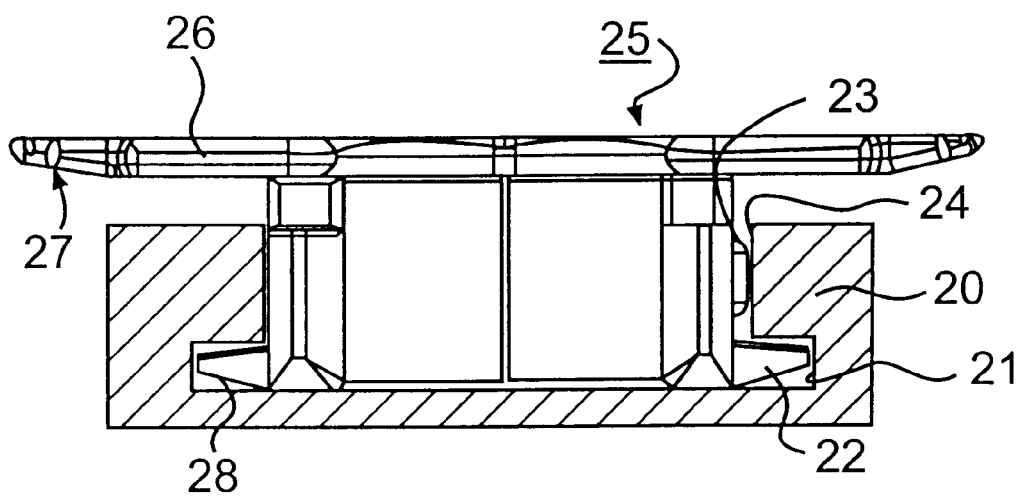
FIG. 2 is an end view, partly in section, of the conveyor belts moving through a wearstrip channel in a configuration that permits a laterally extending sprocket wheel access to mating sprocket grooves on either side of the belt at a position under the outer wings of the upper transport surface.

In FIG. 2, the belt rests on and moves through a section 20 of wearstrip of suitable low resistance characteristics, so that grooves 21 serve to keep the flanges 22 of the belt links down to ride in flutterless motion. The roller 23, preferably supplied on at least one side of the link 25, in this embodiment abuts the right side abutment 24 to reduce friction and reduce the higher belt tension and the driving loading encountered at inner curvatures of the belt as it curves along its travel path.

An upper replaceable conveying platform member 26 is in place. Such platform members may be chosen for variable belt loading requirements, for example to provide high friction or low friction surfaces, or to present surfaces or pockets for particular containers to be conveyed. The material of these conveying platform members 26 can present high strength or high stiffness as the need may be, and may be textured or grooved for various advantages. In some applications a directional texture may direct the product to slide toward the centerline of the belt and discourage the product from vibrating toward the outer edge of the belt. If desired the platform members 26 may have clamps, edge guides or other platform members that are advantageous with differing types of loads. It is thus significant that the removable platform in combination with the knuckle belt coupling configuration presents a highly advantageous universal characteristic to the belt drive systems, whereas the prior art typically with integral platforms required custom built belts for different products and belt conditions. Note that the platforms are tapered upwardly 27 at the outer edges and the bottom of the links 25 are tapered upwardly 28 at the outer edges to provide clearance for sprocket wheels. In the embodiment of FIG. 2A, the V-shaped upper platform configuraton urges products to move toward the center of the belt.

In FIG. 3, wherein the removable platform members 26 are installed in place upon each link 25, belt curvature is accomodated by the loosely mating nose 32 and crotch 33 portions of the platform members, and the corresponding mating leading fingers 30 near outer edges of the platform which loosely mate into the trailing grooves 31. Thus a substantially continous transport surface is maintained along the length of the belt. Because of the specific shape of these platforms to ride upon the top surface of the links, the nose and bifucated crotch structure is advantageous. Thus, there is no sharp dividing line laterally across the links that may serve as a greater impediment to movement of articles longitudinally upon the belt transport surface, as required in various industrial work stations that load or unload articles from moving conveyor belts. This gradual or distributed spacing or crack between links thus is better suited for conveyor belt transport services, particularly for carried objects that take up a considerable portion of the belt width.

Figure 7:
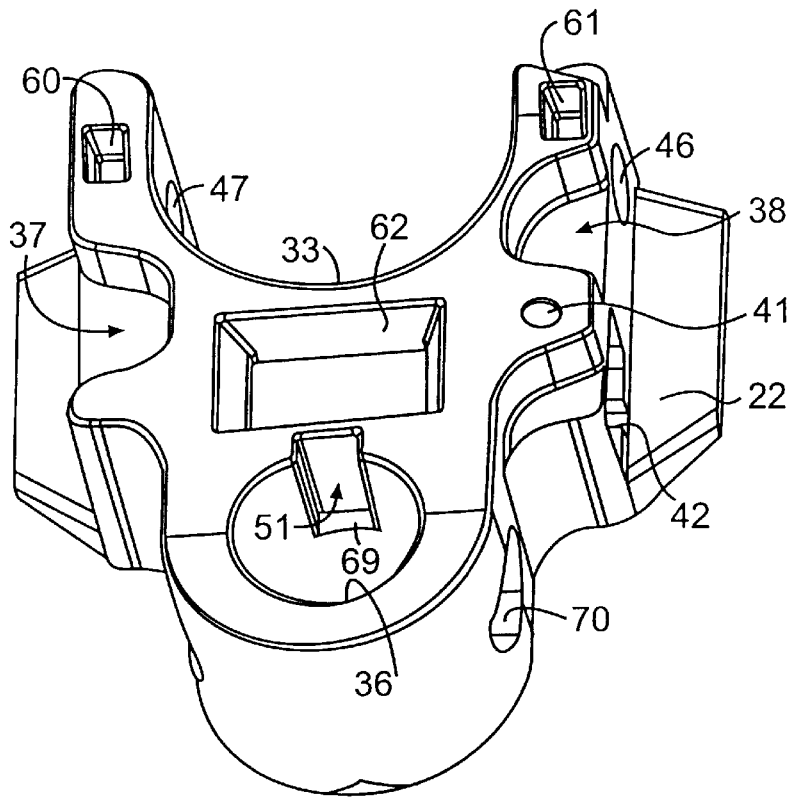
FIGS. 7 and 8 are respectively top and bottom perspective views of a link in a preferred embodiment of the invention.

As seen from the fragmental belt portion in FIGS. 4 and 7, the aforesaid platform noses 32 are superimposed over the substantially cylindrical interconnection knuckles 35. These knuckles 35 are journalled loosely enough in the surrounding cylindrical bores 36 to permit the links to pivot laterally about a curved path and to provide longitudinal slack along the belt. The drive notches 37, 38, alternately interleaved on opposite sides of the links receive the sprocket teeth in the manner shown in FIG. 1. For mating with different drive wheels, such as spider wheel 19 and power drive wheels 16 18, the notches 37 and 38 on opposite sides may be shaped differently and extend to different depths.

Figure 5:
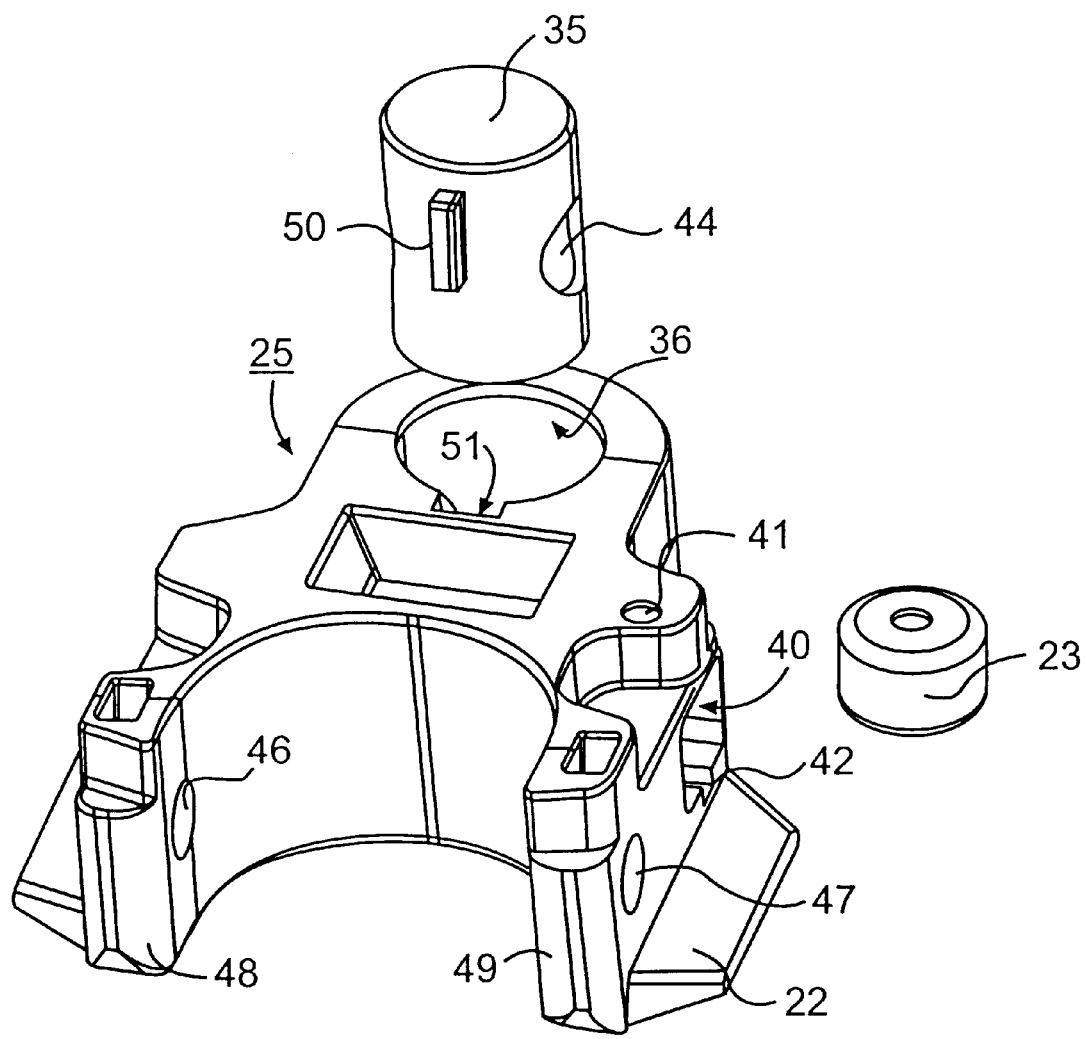
FIG. 5 is an exploded perspective view of a belt link, looking into the roller side, with the roller and coupling knuckle displaced.

As seen by comparison with the exploded view of FIG. 5, the roller wheels 23 are housed in grooves 40, as retained by pins through the bores 41, which are frictionally held or retained by the platform, to extend into lower end slots 42. Thus, assembly and in-field replacement of the rollers is expedited. A tool for example may be inserted into the slot 42 to force the retention pin upwardly for removal and replacement of a roller. Alternative embodiments could be wheels 23 with integral pins or pins held by gravity to rest upon the lower slot 42 platform.

It has been a tedious and delicate task in the prior art to mount knuckles 35 for coupling belt links together. Thus, a journalling rod 45 retained in spanning aprertures 46, 47 of the bifucated trailing legs 48, 49 of the links 25 extends through the knuckle journalling aperture 44 to freely rotate thereon. This provides vertical pivoting action of the belt and essentially thus by cooperative action of longitudinally oriented slots 71 extending through opposite nose walls makes the knuckle joint a universal joint with both lateral and vertical pivot axes. Thus, the knuckle aperture 44 needs to be aligned with the spanning apertures 46, 47 in the bifurcated legs both vertically and rotationally and retained in that position as the journalling rod 45 is driven frictionally into place. An end of the rod can be knurled to help keep it in place.

To resolve this problem a key 50 protrudes vertically part way downwardly in the upper region of knuckle 35. The key 50 is positioned to mate into the blind slot 51 extending downwardly to form the ledge 69 at its blind end located in the upper end of the cylindrical housing 36. The key 50 and slot 51 may be alternatively located respectively on the link 25 and the knuckle pin 35. This mechanism is arranged to hold the knuckle 35 both vertically from falling out of the bottom of the belt and rotationally registered into position for receiving the journalling rod 45, thus leaving both hands free for attention to driving the journalling rod 45 into the receptacle bores 46, 47. Furthermore, once the platform member 26 is in place, the knuckle is prevented from falling out of the top of the belt as it is being worked on.

Figure 6:
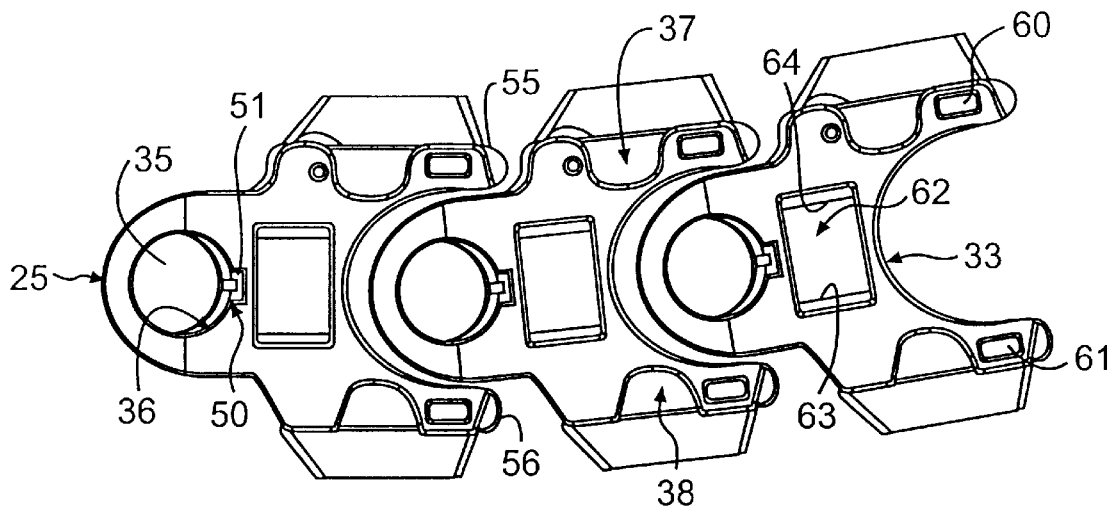
FIG. 6 is a top plan view of a segment of a conveyor belt embodiment without the removable conveyor platform members in place.

As seen from the top view of the belt in FIG. 6, the widened slot 51 permits the knuckle to pivot as the belt navigates laterally curved paths. In this respect it is seen that the link noses 32 loosely enough mate into crotches 33 to accomodate a degree of lateral belt pivoting, within the limits imposed by the trailing shoulders 55, 56. Also the tolerances of the knuckles 35 in the journalling cylindrical bores 36 is enough to provide a degree of longitudinal slack in the belt under load carrying conditions.

Figure 8:
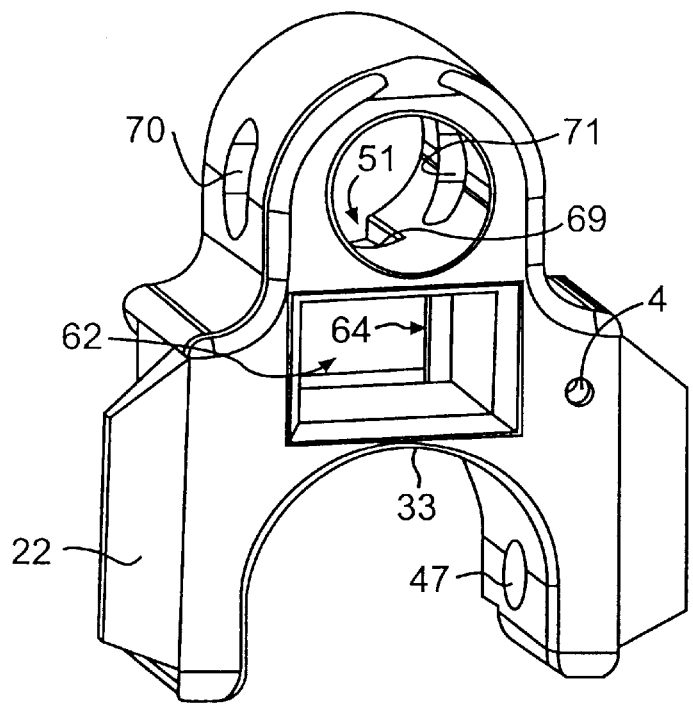
Figure 9:
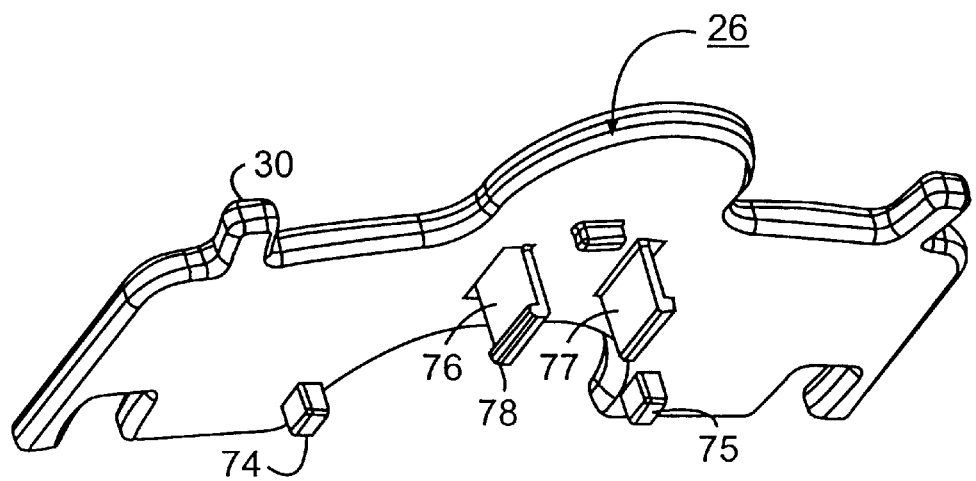
FIG. 9 is an underside perspective view of a removable snap-in fit conveyor platform member afforded by this invention.

The indentations 60, 61, the blind slot 51, and the rectangular through hole 62 with internally directed side ridges 63, 64 provide a snap-in seat for securing the platform members 26 to each of the links 25, as better seen by reference to FIGS. 7–9. The three point mount 60, 61, 62 on the links 25 will receive mating members 74–77 on the platforms 26 to prevent movement between the links 25 and mating mounted platforms 26 in any lateral direction. The two flexible plastic spring panels 76, 77 constitute snap-in structure where the catches 78 on the platform member 26 over-ride and clamp underneath ridges 64 within the rectangular reception apertures 62 of the links, holding the platforms down in place without vertical movement.

In FIGS. 7 and 8, the slots 70, 71 extending through opposite nose walls are shown. This permits the knuckle journalling rod, which is friction fit into apertures 46, 47 to swivel as the belt curves.

The rectangular aperture 62, intermediate the nose aperture 36 and the crotch 33 additionally serves from the bottom as shown in FIG. 8 to serve as a bottom drive sprocket hole for the conveyor belt. With the two side sprocket receptacle indentations 37, 38 this provides a novel and versatile three way drive link.

Figure 10:
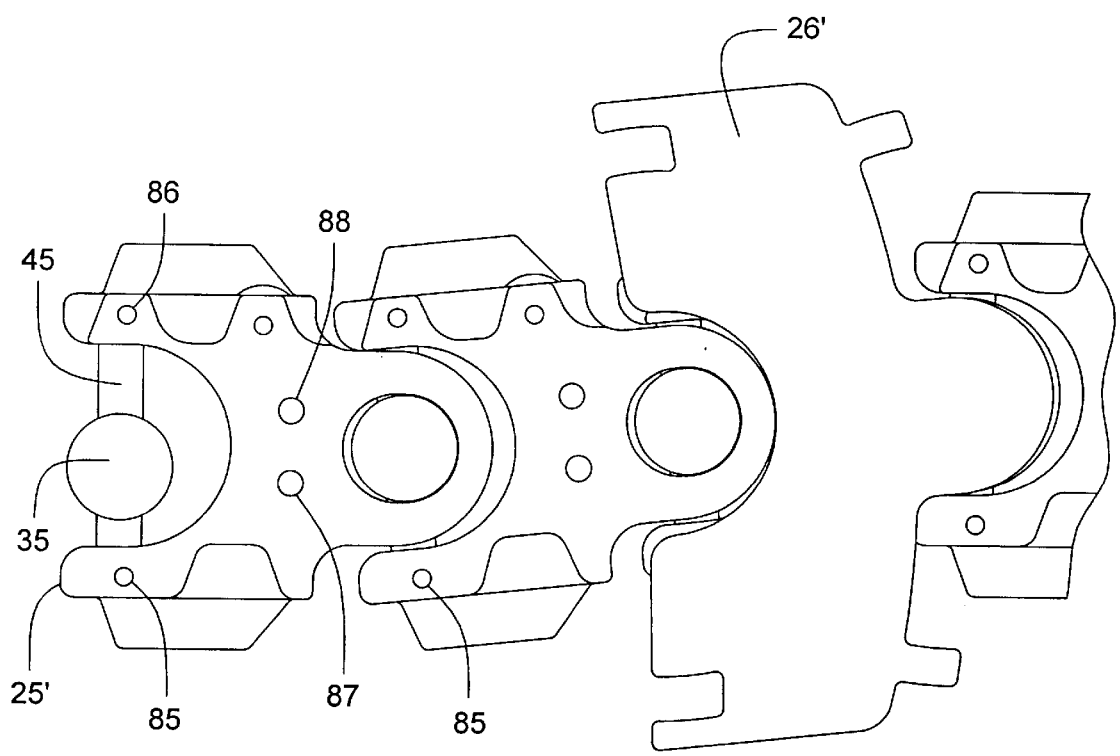
FIG. 10 is a top plan fragement of a further conveyor belt embodiment having one plug-in platform member in place.
Figure 11:
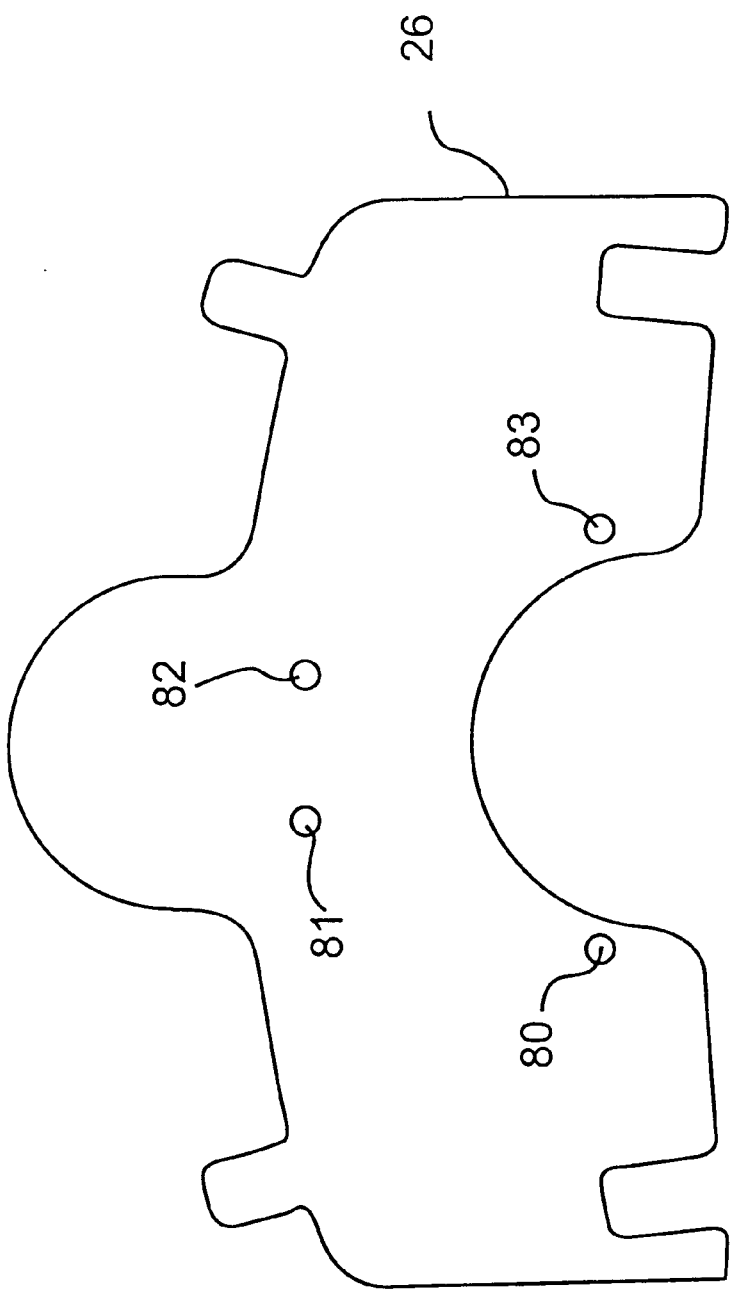
FIG. 11 is a bottom plan view of the platform member shown in FIG. 10.

In FIGS. 10 and 11 are shown a different mounting embodiment for the removable platform member 26', which constitutes a plug-in member frictionally retained in place by pegs or plugs 80–83 rather than a snap-in member which is detented into a locked down condition. In this embodiment, the four plugs 80–83 of the platform member 26' mate into the four receptacle indentations 85–88 of the modified link body 25'. The indentations 87 and 88 look into the underlying rectangular aperture that may serve as a lower surface sprocket drive tooth receptacle.

It is clearly seen from the aforesaid link construction that it may be molded from suitable plastic materials into a strong rugged element for use in industrial applications which strongly resists catastrophic failures at highly stressed locations and is devoid of flimsy narrow integral joints, and the like, which are subject to failure.

It is therefore seen that this invention provides knuckle-type conveyor belt links with removable platforms having novel structure and producing novel interacting functional advantages over prior art conveyor systems, which are set forth with particularity in the following claims as representative of the spirit and nature of the present invention.

What is claimed is:

1. A link conveyor belt comprising in combination: an interconnected series of plastic link bodies defining a trailing yoke having a crotch and two bifurcated legs and a leading nose portion for mating into a crotch of an adjacent end-to-end connected link, said nose portion having a cylindrical vertically oriented aperture through the link body with slots through cylindrical walls disposed on opposite lateral sides, said yoke having trailing bifurcated trailing legs dimensioned to loosely encompass said nose portion of a trailing link thereby permitting said conveyor belt to move along a curved path, wherein the links are coupled together in a power drive relationship by a generally cylindrical knuckle with a vertical axis loosely fitting into said cylindrical aperture and retained therein by a journalling spindle rod affixed between said bifurcated legs for producing in cooperation with said slots on the lateral sides a degree of slack in a longitudinal conveyance direction of the conveyor and a degree of pivoting about curved pathways, said journalling spindle rod being passed loosely through a lateral aperture through said knuckle thereby rotatably extending between the bifurcated legs to mate in the knuckle aperture, said knuckle thereby presenting a substantially mated cylindrical drive surface engaged with said cylindrical aperture as the belt moves in tension under load.

2. The conveyor belt of claim 1 further comprising: a load carrying platform member removably fitting onto said plastic links for quick installation.

3. The conveyor belt of claim 2 wherein the surface platform member comprises a laterally extending panel with a plurality of substantially cylindrical pegs extending from a lower surface and mating into cylindrical cavities on the links to frictionally retain said platform member on a corresponding yoke link.

4. The conveyor belt of claim 2 wherein the platform member comprises a load carrying panel with a pair of resilient substantially rectangular integral plastic spring panels protruding normally from a lower surface, each spring panel defining a detent latching member, and wherein said link defines receptacle cavity means with mating detent members for receiving said spring panels in a snap-lock fitting engagement thereby to retain the platform panel locked in place on a corresponding link.

5. The conveyor belt of claim 4 wherein said receptacle cavity means further comprises a substantially rectangular aperture extending vertically through the link to present a sprocket drive aperture on a lower link surface.

6. The conveyor belt of claim 1 further comprising on an upper surface of each link a load carrying platform member extending laterally outwardly from the yoke and removably affixed thereto.

7. The conveyor belt of claim 6 wherein said platform member has a nose edge mating on the link nose and a mating crotch edge with bifurcated legs mating on the link bifurcated legs, and further comprising interlocking fingers on each side of said nose disposed to mate into corresponding indentations in each of the bifurcated legs.

8. The conveyor belt of claim 1 further comprising sprocket drive indentations in each link on at least one of two opposite lateral sides thereof.

9. The conveyor belt of claim 1 further comprising flanges extending laterally from opposite sides of each link for riding in a channel member defining a belt path.

10. The conveyor belt of claim 1 further comprising on at least one side of each link a roller disposed to contact a railing alongside the belt to reduce friction when navigating an inner curvature location in a belt path.

11. A plastic link body for a link conveyor belt, comprising in combination: a forward pointed nose section with a cylindrical vertical bore for accommodating a substantially cylindrical knuckle connector member serving to connect links end-to-end in a conveyor belt, said nose section integrally defining trailing bifurcated legs having a crotch therebetween shaped to mate said nose section of a trailing link thereinto, a further aperture extending through the link body intermediate the cylindrical bore and crotch adapted to receive sprocket drive teeth located on an under side of a conveyor belt, and horizontally disposed slots through the nose section into said cylindrical bore on opposite sides of the link for passing a connecting spindle secured in said bifurcated legs through the cylindrical bore and a knuckle connector member internally disposed in said cylindrical bore, said slots thereby introducing a degree of longitudinal slack in the conveyor belt and a degree of pivoting of connected link members for permitting the conveyor belt to navigate a curved path.

12. The link body of claim 11 further comprising: receptacle means for removably positioning and retaining a conveying platform member.

13. The link body of claim 12 wherein the receptacle means further comprises snap-fit detenting means within said further aperture for receiving and locking in place a set of flexible snap-fit spring detent members located on said removable conveying platform member.

14. The link body of claim 12 wherein said conveying platform member includes a high friction surface to engage conveyed loads in frictional contact.

15. The link body of claim 11 further comprising sprocket tooth receiving indentations on opposite sides of the link body.

16. The link body of claim 11 wherein said cylindrical vertical bore has a vertically oriented keyway indented in a cylindrical wall of the bore for receiving, locating and retaining a substantially cylindrical knuckle with a protruding mating key in a position in said keyway for receiving a pivot rod spindle through said bifurcated legs of a leading link body thereby to pivotally connect link bodies end-to-end in a belt configuration.

17. The link body of claim 11 further comprising three sets of sprocket drive receptacle means respectively located on two lateral sides of the link body and a lower side of the link body.

18. The link body of claim 11 further comprising a pair of upwardly slanted flanges extending laterally from a lower portion of the link body adapted to be confined in a wear surface channel disposed along a portion of a belt pathway to keep belt links from fluttering.

19. The conveyer belt of claim 11 further comprising a mating cavity on a lateral side of the link body for receiving a roller with means for securing the roller in place with a journalling shaft for the roller fit in an upper aperture and extending downwardly into a lower lateral slot accessible from one side of the link body.

20. In a knuckle style conveyor belt link, a seat configuration for receiving in a seat formed in a conveyor belt link body a mating substantially cylindrical knuckle for connecting belt link bodies together in a link conveyor belt, the seat configuration comprising mating interengageable structure on said seat and said knuckle for stably retaining the knuckle and the seat in mating relationship prior to installation of a pivot spindle rod through the knuckle to interconnect end-to-end link bodies into a link conveyor belt.

21. The seat configuration defined in claim 20, wherein the substantially cylindrical knuckle includes a ridge key extending from an outer surface of the knuckle and wherein the seat includes a substantially cylindrical knuckle-receiving cylindrical bore in the conveyor belt link having a keyway indentation in a cylindrical bore surface for receiving said ridge key to prevent rotation of the knuckle and to align the knuckle for receiving said pivot spindle rod.

22. A drive interconnection configuration for sprocket driving of link conveyor belts of the type having a coupling knuckle between successive links with end-to-end links coupled together in tension, comprising in combination, a link body comprising a nose with a substantially cylindrical knuckle receiving aperture vertically extending through the link body and integrally disposed trailing bifurcated legs defining a crotch for loosely receiving the nose of an end-to-end connected trailing link in a belt configuration, said crotch having aperture means for receiving a spindle rod extending between the bifurcated legs for connecting end-to-end links into a belt configuration, said coupling knuckle dimensioned to fit loosely into said cylindrical knuckle receiving aperture and having an aperture for snugly receiving said spindle rod through the knuckle in a rotatable bearing relationship, and said nose defining on opposite link lateral sides horizontal slots for passing the spindle rod through into the cylindrical knuckle receiving aperture in a configuration permitting a three dimensional degree of movement so that the conveyor belts can travel over curvaceous transport paths.

23. A conveyor belt system, comprising in combination, a conveyor belt formed by a set of interconnected links adapted to follow a curved pathway, said links comprising a plastic body with a leading nose portion and integral trailing set of bifurcated legs with a removable pivotable knuckle mounted in the nose portion as pivot coupling means between end-to-end belt links, and sprocket receiving drive indentations disposed on opposite lateral sides of the link for engagement with laterally disposed sprockets for moving said conveyor belt.

24. The conveyor belt system of claim 23 wherein the links further comprise removably mounted platform members adapted to carry good along the belt pathway.

25. The conveyor belt system of claim 23 disposed in said system in combination with a similar conveying belt with drive sprockets for moving the two belts side-by-side in substantially parallel paths in opposite directions.

26. The conveyor belt system of claim 25 further comprising a sprocketed spider wheel separating the respective belts a predetermined distance and laterally engaging said sprocket indentations on the respective belts.

27. In a plastic modular link conveyor belt, the combination comprising: plastic modular links each having a link body with integral pivot rod journalling structure thereon for connecting modular links pivotably together to form said conveyor belt being configured to present a movable load bearing transport platform, a detachable load bearing upper surface member for frictional contact with a carried load for detachably fitting upon said transport platform in a load bearing configuration, and interconnecting means for detachably fitting the links and upper surface member stably together as a transport unit for transporting loads along a conveyor belt transport path comprising registration and retention elements interacting between the link body transport platform and the detachable upper surface member.

28. The combination defined in claim 27 wherein said link body transport platform and said upper surface member are of a substantially similar configuration capable of following curved belt transport paths.

29. The combination defined in claim 27 wherein said interconnecting means comprises a set of interfitting female-male elements positioned in at least three spaced receptacle sites on said transport platform.

* * * * *

UNITED STATES PATENT AND TRADEMARK OFFICE
CERTIFICATE OF CORRECTION

PATENT NO.    : 6,209,716 B1
DATED         : April 3, 2001
INVENTOR(S)   : David W. Bogle et al.

It is certified that error appears in the above-identified patent and that said Letters Patent is hereby corrected as shown below:

Title page,
Item [73], Assignee, insert -- Hartness International, Greenville, SC (US) -- after "The Laitram Corporation, Harahan, LA (US)"

Signed and Sealed this

Tenth Day of December, 2002

JAMES E. ROGAN
*Director of the United States Patent and Trademark Office*